US008726262B2

(12) United States Patent
Ohama

(10) Patent No.: US 8,726,262 B2
(45) Date of Patent: May 13, 2014

(54) FIRMWARE UPDATE SYSTEM AND INFORMATION APPARATUS, AND PROGRAM

(75) Inventor: Nobuyuki Ohama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 381 days.

(21) Appl. No.: 13/120,219

(22) PCT Filed: Aug. 18, 2010

(86) PCT No.: PCT/JP2010/063934
§ 371 (c)(1),
(2), (4) Date: Mar. 22, 2011

(87) PCT Pub. No.: WO2011/024688
PCT Pub. Date: Mar. 3, 2011

(65) Prior Publication Data
US 2011/0179406 A1    Jul. 21, 2011

(30) Foreign Application Priority Data

Aug. 24, 2009 (JP) ................................. 2009-193235

(51) Int. Cl.
*G06F 9/44* (2006.01)
(52) U.S. Cl.
USPC ........................................................ 717/168
(58) Field of Classification Search
USPC ................... 717/120–122, 168–178
See application file for complete search history.

(56) References Cited

U.S. PATENT DOCUMENTS 7,080,371 B1   7/2006  Arnaiz et al.
7,631,174 B2  12/2009  Koizumi
7,873,669 B2 *  1/2011  Netz et al. ..................... 707/796
2004/0145766 A1  7/2004  Sugishita et al.
2006/0004756 A1  1/2006  Peleg et al.
2008/0126672 A1  5/2008  Ljung
2008/0172584 A1  7/2008  Meller et al.

FOREIGN PATENT DOCUMENTS

| CN | 1930551 A | 3/2007 | |
| CN | 101510161 A | 8/2009 | |
| EP | 1 431 874 A2 | 6/2004 | |
| EP | 1956482 A1 * | 6/2007 | ............. G06F 9/445 |
| JP | 11-110218 A | 4/1999 | |
| JP | 2002-506249 A | 2/2002 | |

(Continued)

OTHER PUBLICATIONS

Xdelta: URL=http://xdelta.org/, Release 3.0.0, Jan. 8, 2011.

(Continued)

*Primary Examiner* — Ted T Vo
(74) *Attorney, Agent, or Firm* — Mattingly & Malur, PC

(57) ABSTRACT

The present invention provides a firmware update process capable of realizing both recovery from an interruption of update and saving of a capacity of nonvolatile memory used for backup and storing difference data. Thus, intermediate data is included for always holding a status of firmware in rewriting in addition to the new and old firmware. In a case of updating all blocks configuring the firmware in an arbitrary order, the process successively compares blocks of the intermediate data and new firmware with each other; calculates an address of data for recovery from an interruption of update and a backup capacity required therefor; extracts difference data to be distributed, calculates a capacity thereof and creates an update procedure; and derives a processing order whose total of the backup capacity and the difference data capacity is the minimum (see FIG. 2).

8 Claims, 9 Drawing Sheets

(56) References Cited

FOREIGN PATENT DOCUMENTS

| | | |
|---|---|---|
| JP | 2004-194298 A | 7/2004 |
| JP | 2004-310221 A | 11/2004 |
| JP | 2008-501180 A | 1/2008 |
| JP | 2008-27331 A | 2/2008 |

OTHER PUBLICATIONS

Chinese Office Action received in Chinese Application No. 201080002439.8 issued Dec. 20, 2012.

European Search Report received in European Application No. 10811738 dated Mar. 19, 2014.

* cited by examiner

FIG. 6A

Status 6A-1

| Processing status table | Old data | | Intermediate data | | New data | | Backup necessity TB | Difference distribution necessity TB |
|---|---|---|---|---|---|---|---|---|
| -1 | 1 | C | 1 | C | 1 | B | 1 | 0 |
| 0 | 2 | B | 2 | B | 2 | Z | - | - |
| 0 | 3 | A | 3 | A | 3 | B | - | - |

Status 6A-2

| Processing status table | Old data | | Intermediate data | | New data | | Backup necessity TB | Difference distribution necessity TB |
|---|---|---|---|---|---|---|---|---|
| 1 | 1 | C | 1 | B | 1 | B | 1 | 0 |
| -1 | 2 | B | 2 | B | 2 | Z | 0 | 1 |
| 0 | 3 | A | 3 | A | 3 | B | - | - |

Status 6A-3

| Processing status table | Old data | | Intermediate data | | New data | | Backup necessity TB | Difference distribution necessity TB |
|---|---|---|---|---|---|---|---|---|
| 1 | 1 | C | 1 | B | 1 | B | 1 | 0 |
| 1 | 2 | B | 2 | Z | 2 | Z | 0 | 1 |
| -1 | 3 | A | 3 | A | 3 | B | 1 | 0 |

FIG. 6B

Status 6B-1

| Processing status table | | Old data | | Intermediate data | | New data | | Backup necessity TB | Difference distribution necessity TB |
|---|---|---|---|---|---|---|---|---|---|
| 0 | | 1 | C | 1 | C | 1 | B | - | - |
| -1 | | 2 | B | 2 | B | 2 | Z | 1 | 1 |
| 0 | | 3 | A | 3 | A | 3 | B | - | - |

Status 6B-2

| Processing status table | | Old data | | Intermediate data | | New data | | Backup necessity TB | Difference distribution necessity TB |
|---|---|---|---|---|---|---|---|---|---|
| -1 | | 1 | C | 1 | C | 1 | B | 1 | 1 |
| 1 | | 2 | B | 2 | Z | 2 | Z | 1 | 1 |
| 0 | | 3 | A | 3 | A | 3 | B | - | - |

Status 6B-3

| Processing status table | | Old data | | Intermediate data | | New data | | Backup necessity TB | Difference distribution necessity TB |
|---|---|---|---|---|---|---|---|---|---|
| 1 | | 1 | C | 1 | B | 1 | B | 1 | 1 |
| 1 | | 2 | B | 2 | Z | 2 | Z | 1 | 1 |
| -1 | | 3 | A | 3 | A | 3 | B | 1 | 0 |

FIG. 7

| Block No. | Writing back original address |
|---|---|
| 1 | Fbup_start size |
| 2 | Fdat_1_start size |
| 3 | Fbup_start size |

FIG. 8

| Processing procedure | Update procedure |
|---|---|
| 1 | COPY(Fdat_2_start, size, Fdat_1_start) |
| 2 | ADD(Fdlt_start, size, Fdat_2_start) |
| 3 | COPY(Fdat_1_start, size, Fdat_3_start) |

| Processing procedure | Update status |
|---|---|
| 1 | BupEND END |
| 2 | BupEND |
| 3 | |

B (B-1)

Backup | 1

(B-2)

Update process | 110000000000

Writing back original address table

Fbup_start size/2, Fdat_1_start+size/2 size/2

B

Update procedure document

ADD(Fdlt_start, size/2, Fdat_2_start), COPY(Fdat_1_start, size/2, Fdat_2_start+size/2)

FIRMWARE UPDATE SYSTEM AND INFORMATION APPARATUS, AND PROGRAM

TECHNICAL FIELD

The present invention relates to a firmware update system and an information apparatus configuring a part thereof and, for example, to a technique that, in a field of embedded apparatuses, rewrites firmware stored in a nonvolatile memory, such as a NOR-type flash memory.

BACKGROUND ART

Since, in a field of home electrical appliances, read-only file systems have often been used, it is impossible to perform writing in units of files using functions of a file system. Therefore, when firmware is updated, it is required to rewrite the image of the firmware. In general, a firmware image is large in size. Accordingly, when the firmware is updated, a method is used of extracting and distributing only a difference instead of the entire image.

Methods of extracting a difference include an entire image comparison method that entirely compares new and old firmware images with each other in units of bytes and extracts the difference (e.g., see Non Patent Literature 1). When an information apparatus creates the new image from the difference, the entire image comparison method requires the entire old image. Accordingly, it is necessary to back up the entire old image for the sake of recovery after an interruption of update. This is because the old data having been rewritten does not remain on a RAM, which necessitate taking backup of the entirety thereof in order to recover the old image.

On the other hand, there is a method of holding a firmware image and its entire backup (e.g., see Patent Literature 1).

Further, methods extracting a difference of firmware images in a form capable of recovery after an interruption of update include a divided block comparison method that compares blocks (corresponding to blocks of a nonvolatile memory for storing firmware) configuring new and old images with each other in units of blocks and adds data in the block without any match to difference data to be distributed. In a case of applying the difference according to this method, the block to be rewritten is backed up.

CITATION LIST

Patent Literature

Patent Literature 1

JP Patent Publication (Kokai) No. 11-110218A (1999)

Non Patent Literature

Non Patent Literature 1

The xdelta software packages relating to open-source binary differential files which are available xdelta.org.

SUMMARY OF INVENTION

Technical Problem

However, while the entire image comparison method described in Non Patent Literature 1 reduces difference data in size, this method requires the entire old image as a backup for recovery after an interruption of update, thereby increasing the size.

On the other hand, the divided block comparison method only requires the block on rewriting as the backup for recovery after an interruption of update. However, even if data identical to data to be rewritten resides in another block in the old image, this method takes a backup separately from that. This wastes the nonvolatile memory. Further, comparison in units of blocks enlarges the difference data.

The present invention is made in view of these situations, and provides a technique that is capable of reducing the total size of a backup region and a region for storing the difference data required for recovery after an interruption of update and thereby allows firmware to be updated efficiently and inexpensively.

Solution to Problem

In order to solve the above problems, a firmware update system according to the present invention includes: a management apparatus generating firmware update data; and an information apparatus acquiring the firmware update data and updating the old firmware to the new firmware. The management apparatus generates difference data from data of the old firmware and the new firmware, generates an update procedure document describing an update process for generating the new firmware from the old firmware and the difference data in the information apparatus, generates writing back reference information (writing back original address table) describing information for performing a process (writing back process) of recovering data in an update process in the information apparatus to a state before starting of the update process when the update process has been interrupted. The firmware update data (distribution package) is generated as data for performing an update process in units of blocks.

The management apparatus provides plural types of processing orders for performing an update process on the plurality of blocks, generates intermediate data representing a status of each block in rewriting from the old firmware to the new firmware with respect to each processing order, and checks necessity of backup and necessity of extracting difference data in the units of blocks using the new firmware and the intermediate data. Further, the management apparatus identifies the processing order whose total value of a capacity required for the backup and a capacity required for storing the difference data among the plurality of processing orders on the basis of a check result pertaining to the necessity of backup and the necessity of extracting the difference data is the smallest. The identified processing order is described in the update procedure document. More specifically, the management apparatus compares a processing target block and other blocks with each other in the intermediate data, and checks the necessity of backup according to whether the blocks match with each other or not, and compares a processing target block in the new firmware and all blocks in the intermediate data with each other, and checks the necessity of extracting the difference data according to whether the blocks match with each other or not.

The management apparatus describes the writing back reference information so as to instruct a reference position and a size of data for performing the writing back process in units smaller than a size of the block and thereby to allow data of the writing back process to be acquired from a plurality of positions. The management apparatus describes an update procedure of the update procedure document so as to instruct a reference position and a size of data for performing the update process in units smaller than a size of the block and thereby to allow data of the update process to be acquired from a plurality of positions.

On the other hand, the information apparatus manages an update status including information representing that a backup has been completed and information representing that an update process has been completed in units of blocks in correspondence with a processing procedure of the update procedure document.

In a case of occurrence of a processing interruption, the information apparatus checks the update status, and identifies which processing procedure is being performed when the interruption has occurred, refers to the update procedure document, and identifies the block in process according to the identified processing procedure, and checks the writing back reference information, performs a data writing back process on the identified block in process, and makes the block be in a state before starting of the update process.

Hereinafter, further features of the present invention will become apparent according to the best mode for carrying out the invention and accompanying drawings.

Advantageous Effects of Invention

The present invention can realize recovery from an interruption of update while saving the capacity of nonvolatile memory used for storing backup data and difference data.

BRIEF DESCRIPTION OF DRAWINGS

FIG. 6A is a diagram showing an example of backup and difference distribution (extraction) necessity check process (FIGS. 4 and 5) having been processed in a prescribed processing order.

FIG. 6B is a diagram showing an example of backup and difference distribution (extraction) necessity check process (FIGS. 4 and 5) having been processed in a processing order different from that in FIG. 6A.

FIG. 7 is a diagram showing an example of a writing back original address table.

FIG. 8 is a diagram showing an example of an update procedure document.

FIG. 9 is a diagram showing an example of an update status.

FIG. 11 is a diagram showing an example of an update procedure and a writing back original address table allowing an operation in units smaller than blocks.

DESCRIPTION OF EMBODIMENTS

Figure 1:
FIG. 1 is a diagram for showing necessity of a fourth policy according to which, in a case where interruption occurs when a block of target data is rewritten, the block should be written back as it was and then update is restarted.

The present invention relates to difference extraction and difference application methods and apparatuses that realize both of recovery from an interruption of update occurring during changed difference data is rewritten and saving the capacity of memory with respect to firmware stored in a nonvolatile memory, such as NOR-type flash memory, in a field of embedded apparatuses.

An embodiment of the present invention will hereinafter be described with reference to accompanying drawings. Note that this embodiment is an example for realizing the present invention and not for limiting the technical scope of the present invention. Common configurational elements in the drawings are assigned with the identical reference numerals.

<Precondition>

The embodiment of the present invention is described on a precondition that a nonvolatile memory used in an embedded apparatus has a limitation capable of erasing only in units of blocks. Accordingly, when a block is rewritten, an operation is performed according to which data of a block after rewriting is created in a volatile memory and subsequently the data is written in the block concerned.

In this embodiment, update of firmware is described based on following four policies, which include:

a first policy: backup region should be one block at the maximum;

a second policy: backup region should be cleared on completion of rewriting of each block;

a third policy: difference data should be stored to the end; and a fourth policy: in a case where interruption occurs when a block of target data is rewritten, the block should be written back as it was and then update is restarted. The fourth policy is for a case where a part of data of a rewriting target block is necessary for rewriting as with FIG. 1. This case is hereinafter referred to as self-reference. FIG. 1 is a diagram for showing an example of a case of self-reference for showing necessity of the fourth policy.

<Configuration of Firmware Update System>

Figure 2:
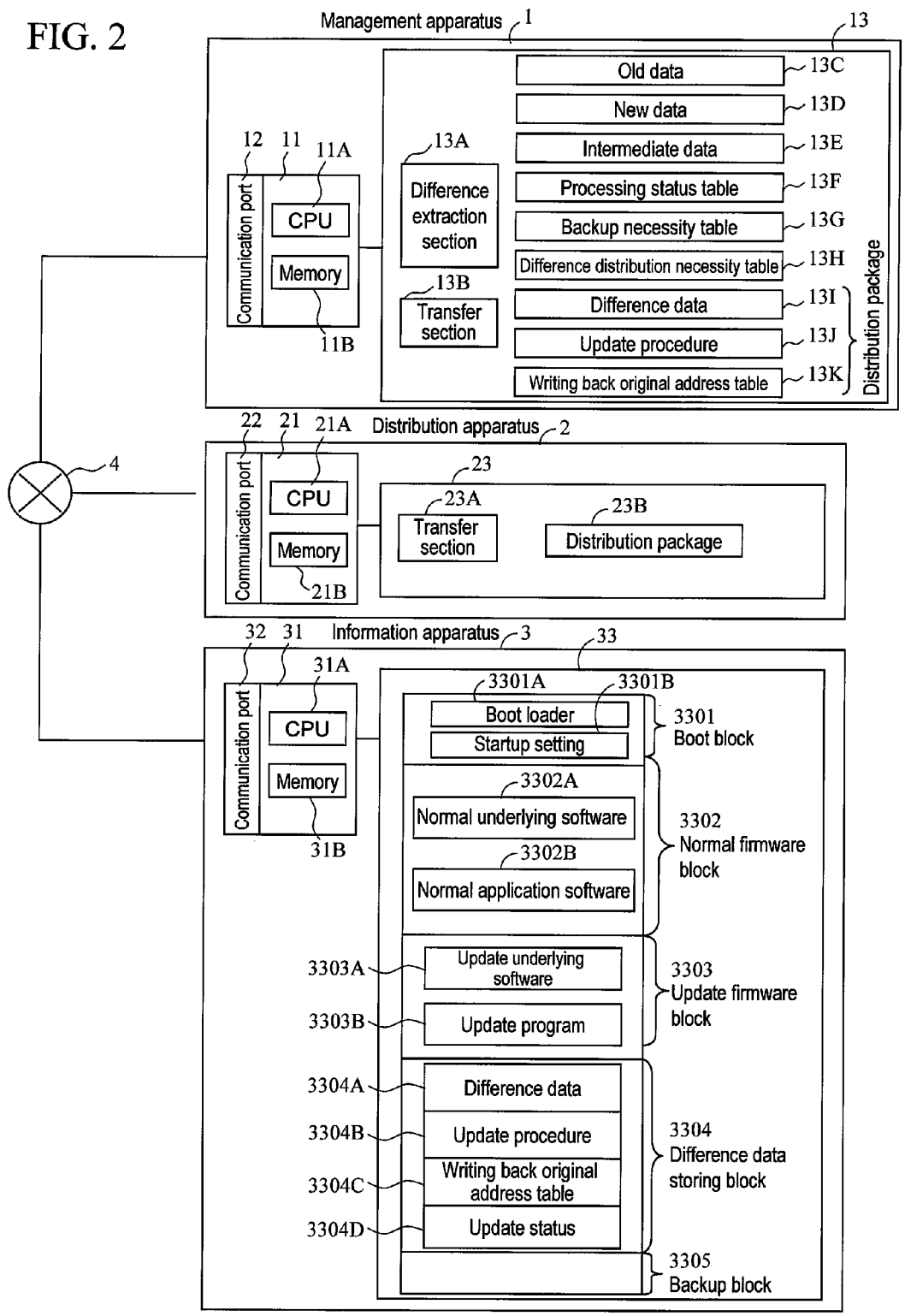
FIG. 2 is a diagram for showing a schematic configuration of a firmware update system according to an embodiment of the present invention.

FIG. 2 is a diagram for showing a schematic configuration of a firmware update system according to the embodiment of the present invention. The firmware update system according to the embodiment includes a management apparatus 1, a distribution apparatus 2 and at least one information apparatus 3.

The management apparatus 1 includes a terminal 11 having a CPU 11A and a memory 11B, a communication port 12 and an external storing apparatus 13. The external storing apparatus 13, which may be a nonvolatile memory, includes: a difference extraction section 13A; a transfer section 13B; an old data storing section 13C; a new data storing section 13D; an intermediate data storing section 13E storing intermediate data for always storing a status of the nonvolatile memory in the midst of updating (data showing a state of data in the midst of rewriting, that is, data showing a status in the midst of rewriting firmware); a processing status table 13F for storing whether data of each block of the nonvolatile memory is unprocessed (0), in process (−1) or processed (1); a backup necessity table 13G; a difference distribution necessity table 13H showing whether the difference is to be extracted and distributed or not; a difference data storing section 13I; an update procedure storing section 13J; and a writing back original address table 13K.

The distribution apparatus 2 includes a terminal 21 having a CPU 21A and a memory 21B, a communication port 22 and an external storing apparatus 23. The external storing apparatus 23, which may be a nonvolatile memory, includes a transfer section 23A and a distribution package 23B.

The information apparatus 3 includes a terminal 31 having a CPU 31A and a memory 31B, a communication port 32 and an external storing apparatus 33. The external storing apparatus 33, which may be a nonvolatile memory, includes: a boot block 3301 to be executed first on startup of the information apparatus 3; a normal firmware block 3302 to be ordinarily used; an update firmware block 3303 used on updating firmware; a difference data storing block 3304 used on updating firmware; and a backup block 3305 used on updating firmware.

The boot block 3301 stores a boot loader 3301A to be performed first on startup of this apparatus, and a startup setting information 3301B identifying firmware to be loaded on the next startup (more specifically, which one of 3302A and 3303A is activated on the next startup). After activation, the boot loader 3301A reads one of the normal firmware block 3302 and the update firmware block 3303. Which one is to be read is according to the startup setting information 3301B. The startup setting information 3301B is switched from a normal firmware block to an update firmware block 3303 when necessity of update occurs, and returned to the normal firmware block after successful completion of update. As to the necessity of update, for example, when update is instructed by the distribution apparatus 2 to the information apparatus 3, or when the information apparatus 3 periodically causes the distribution apparatus 2 to confirm the version of the firmware and, if the version has been renewed, it may be determined that update is necessary.

The normal firmware block 3302 stores normal underlying software 3302A and normal application software 3302B.

The update firmware block 3303 stores update underlying software 3303A and an update program (update process section) 3303B.

The difference data storing block 3304 stores difference data 3304A that is a difference between the present and new firmware, an update procedure 3304B for recording an update procedure, a writing back original address table 3304C used on writing back old data in a data region in rewriting in a case of recovery from an interruption of update, and an update status 3305D for recording an end position of performance of the update procedure representing to which part the update procedure has been completed.

<Overview of Difference Extraction Process>

Figure 3:
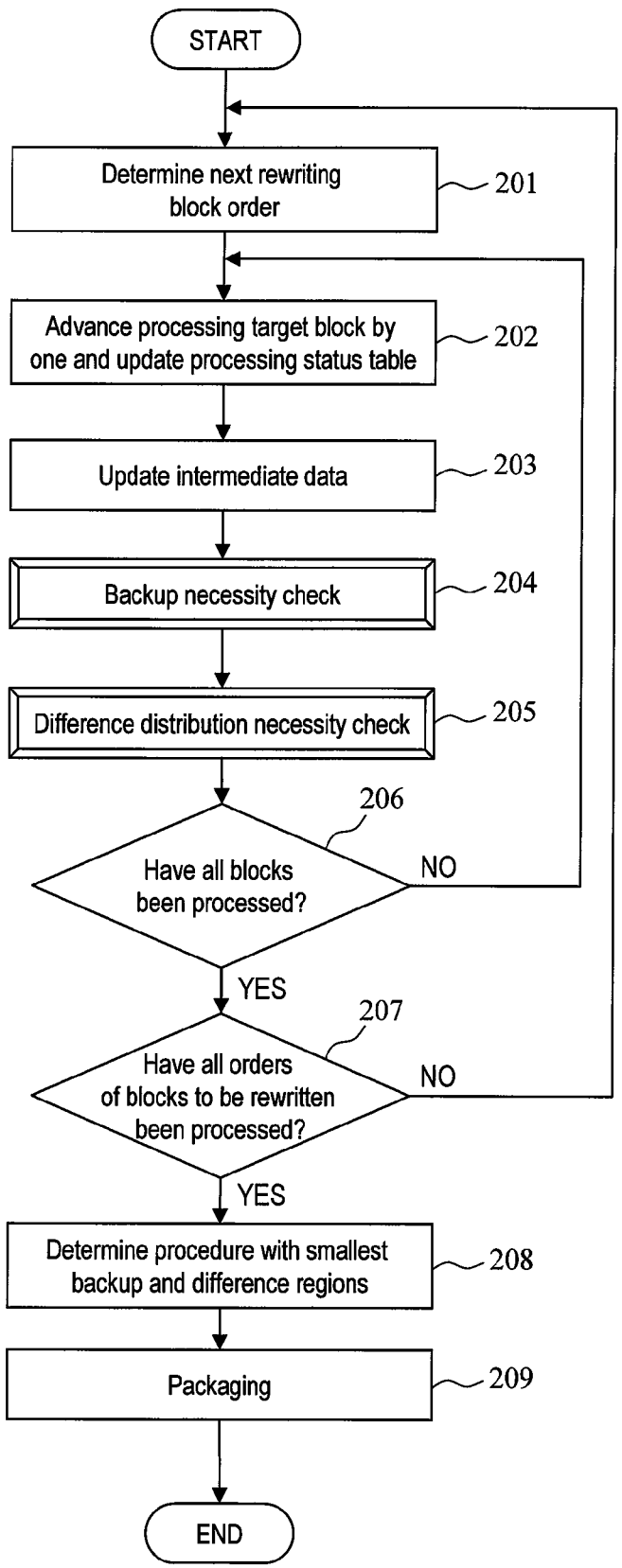
FIG. 3 is a flowchart for schematically illustrating a difference extraction process in a management apparatus.

FIG. 3 is a flowchart for schematically illustrating an overview of difference extraction process in the management apparatus 1. The difference extraction process is, for example, performed when new firmware is input into the management apparatus 1. Although the CPU 11A performs the difference extraction process through (in corporation with) the difference extraction section 13A, the description will hereinafter be made with the difference extraction section 13A being as the subject of the operation.

First, the difference extraction section 13A determines the next order of blocks to be rewritten (step 201). The order of blocks to be rewritten represents an order of rewriting when there are a plurality of blocks to be rewritten. For example, in a case where the nonvolatile memory includes three blocks, rewriting processes in orders of 1→2→3, 2→3→1, . . . , 3→2→1 are examined. Accordingly, in step 201, it is determined in which order examination is to be made in this loop among the plurality of rewriting orders.

The difference extraction section 13A advances the next processing target block according to the determined order and thus updates the processing status table (step 202). For example, in a case of processing in the order of 2→3→1, if the block 2 has been processed last time, the processing target this time becomes the block 3.

Next, the difference extraction section 13A updates intermediate data (step 203). Here, the intermediate data is data for always storing the status of the nonvolatile memory in the midst of updating. That is, in step 203, the block concerned is acquired from the new data and copied to the intermediate data (e.g., see FIG. 6).

The difference extraction section 13A performs a backup necessity check on the block data concerned (step 204). Further, the difference extraction section 13A performs a difference distribution necessity check on this block data (step 205). The details of processes of the backup necessity check and the difference distribution necessity check will be described later using FIGS. 4 and 5.

Subsequently, the difference extraction section 13A checks whether all blocks have been processed or not, and, if not processed, the processing proceeds to step 202, and, if processed, the processing proceeds to step 207 (step 206). The difference extraction section 13A checks whether all orders of blocks to be rewritten have been processed or not, and, if not processed, the processing proceeds to step 201, and, if processed, the processing proceeds to step 208 (step 207).

The difference extraction section 13A determines a rewriting order with the smallest sum of capacities of the backup region and the difference region (step 208). For example, the maximum value among each record in the backup necessity table is adopted as the capacity of the backup region. The sum pertaining to records in the difference distribution necessity table is adopted as the capacity of the difference region. The rewriting order whose total value of the maximum value and the sum of the records is the minimum is determined as the rewriting order in the update procedure 13J. If there are a plurality of orders with the same total value, the procedure calculated first is selected.

Finally, the difference extraction section 13A packages the difference data 13I, the update procedure 13J and the writing back original address table 13K (step 209).

<Details of Backup Necessity Check Process>

Figure 4:
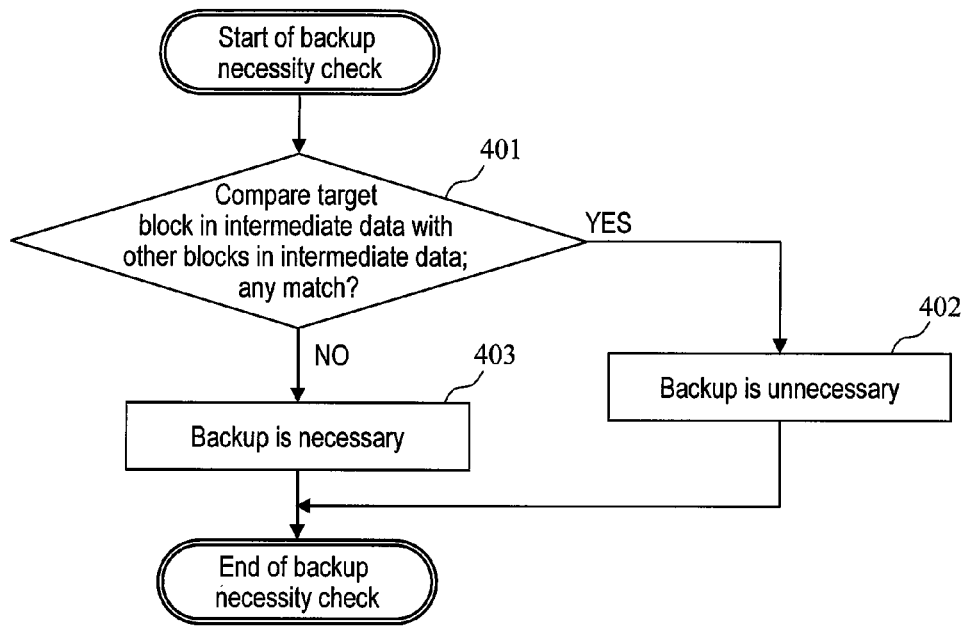
FIG. 4 is a flowchart for illustrating a backup necessity check process in detail.

FIG. 4 is a flowchart for illustrating the backup necessity check process (step 204) in detail.

First, the difference extraction section 13A compares the target block in the intermediate data and other blocks in the intermediate data with each other, and checks whether the blocks match with each other. For example, on the block 1 in a status 6A-1 in FIG. 6A, C (block 1), B (block 2) and A (block 3) are compared with each other. In this case, C does not have its match. Accordingly, it is determined that backup is necessary.

In a case where the match exists (step 401: YES), since there is no need for backup, the difference extraction section 13A writes 0 in the record concerned in the backup necessity table, and describes the writing back original address table so as to perform recovery based on the matching data in the firmware in being rewritten (step 402).

On the other hand, in a case where the match does not exist (step 401: NO), since backup is necessary, the difference extraction section 13A writes 1, which represents the number of the block (this is because this embodiment performs rewriting in units of blocks), in the record in the backup necessity table, and describes the writing back original address table so as to perform recovery based on the backup region (step 403).

<Details in Difference Distribution Necessity Check Process>

Figure 5:
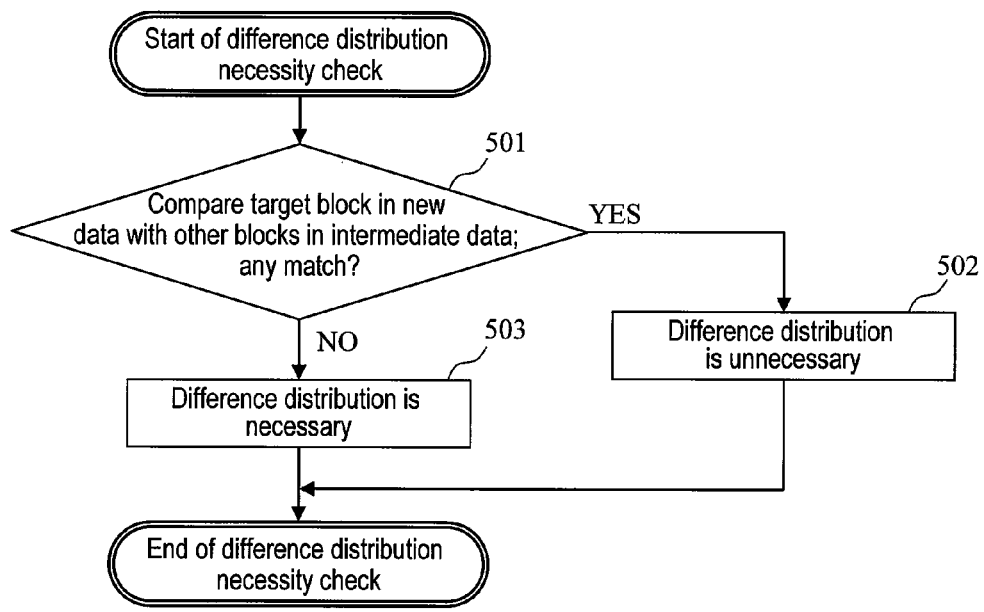
FIG. 5 is a flowchart for illustrating a difference distribution (extraction) necessity check process in detail.

FIG. 5 is a flowchart for illustrating the difference distribution necessity check process (step 205) in detail.

The difference extraction section 13A compares the target block in the new data and blocks in the intermediate data with each other, and determines whether the blocks matches with each other or not (step 501). For example, on the block 1 in the state of 6A-1 in FIG. 6A, B (block 1 of the new data), C (block 1 of the intermediate data), B (block 2 of the intermediate data) and A (block 3 of the intermediate data) are compared with each other. In this case, the match with the B of the block 1 of the new data exists in the block 2 in the intermediate data. Accordingly, it is determined that there is no need for difference distribution.

In a case where the match exists (step 501: YES), since there is no need for difference distribution, the difference extraction section 13A writes 0 in the record concerned in the difference distribution necessity table, and writes an instruction of copying the matching data in the old data to in the record in the update procedure (step 502).

On the other hand, in a case where the match does not exist (step 501: NO), difference distribution is necessary, the difference extraction section 13A writes 1, which represents the number of the block, in the record in the difference distribution necessity table, and writes an instruction of copying based on the distributed difference data (step 503).

<Specific Example of Status Transition>

FIG. 6 is a diagram showing an example of status transition when the intermediate data update process (step 203), the backup necessity check process (step 204 and FIG. 4), and the difference distribution necessity check process (step 205 and FIG. 5) are performed.

FIG. 6A shows a case where a processing order of blocks 1, 2 and 3 is adopted in step 201, and statuses 6A-1, 6A-2 and 6A-3 represent a status immediate after processing of step 205 on the block 1, a status immediate after processing of step 205 on the block 2 and a status immediate after processing of step 205 on the block 3, respectively. FIG. 6B shows a case where a processing order of blocks 2, 1 and 3 is adopted, and statuses 6B-1, 6B-2 and 6B-3 represent a status immediate after processing of step 205 on the block 2, a status immediate after processing of step 205 on the block 1 and a status immediate after processing of step 205 on the block 3, respectively.

In a case where the processing order of the blocks is any one of 1→2→3, 1→3→2, 3→1→2 and 3→2→1, the backup is 1, the difference capacity is 1 and the total thereof is 2, as shown in FIG. 6. On the other hand, in a case of 2→1→3 or 2→3→1, the backup is 1, the difference capacity is 2 and the total thereof is 3, as shown in FIG. 6B. Accordingly, the order processed first in the former case is selected as the optimal update order in step 208.

This embodiment has a precondition that the backup data is erased after block processing. However, if the backup data is not erased after the block processing, for example even in the case of 2→1→3 or 2→3→1 and the backup of the data B is held after the second block is processed, the total of the required capacity of the flash memory is 3 where the backup is 2 and the difference capacity is 1.

<Example of Writing Back Original Address Table>

FIG. 7 is a diagram showing an example of a writing back original address table corresponding to the example of FIG. 6A. The writing back original address table is a table used for recovering the old data or data in rewriting from the backup region when an interruption of update occurs. Since the processing procedure in FIG. 6A is block 1→2→3, the block numbers are 1→2→3 also in the writing back original address table of FIG. 7. However, if the processing procedure is different, the order of numbers of blocks is different accordingly.

When recovery of the data of the processing target block is realized at an update processing interruption, the record corresponding to the block number of the processing target in the writing back original address table is referred to.

For example, as shown in FIG. 7, the address of the backup region is Fbup_start, the address of the n-th block in the firmware region (old data) is Fdat_n_start, and the address of the difference data is Fdlt_start. Here, for the sake of simplicity, the data sizes are unified into "size", representing an erase block size of the nonvolatile memory.

FIG. 7 shows illustrations where rewriting is made from the backup region to the first record, from firmware block in rewriting to the second record, and from the backup region to the third record.

<Example of Update Procedure Document>

FIG. 8 is a diagram showing an example of an update procedure document corresponding to the example of FIG. 6A. In FIG. 8, the processing procedure number matches with the line number. In the example of FIG. 8, a first procedure shows an instruction for performing processing of copying an amount of "size" of data from the beginning of the second block of the firmware block. A second procedure shows an instruction for performing processing of copying an amount of "size" of data from the beginning of the difference region. A third procedure shows an instruction for performing processing of copying an amount of "size" of data from the beginning of the first block of the firmware block.

<Example of Update Status>

FIG. 9 is a diagram showing an example of an update status table showing an update status when the processing procedure 1 has been completed and the processing procedure 2 has been completed up to its backup process.

Update status management methods include a method shown in FIGS. 9A and 9B. For example, as shown in FIG. 9A, this is a method that writes the number of each of the update procedures to the file when the update procedure is started, writes characters of BupEnd representing that backup has been completed when the backup has been completed, and writes characters END representing completion when the update process has been complete, or, as shown in FIG. 9B, divides a regions into a backup log region (B-1) and a log region (B-2) for completion of each record in the update procedure.

In a case of FIG. 9B, a backup log (B-1) is zero-cleared to 0 at the beginning of each record of the update procedure, and 1 is written on completion of backup. Accordingly, only "1", which represents that backup of the block in the update process has been completed, is displayed in the backup log region (B-1). A update status log (B-2) is provided with a block for recording update statuses. This block starts with a status being entirely 0. After completion of the processing, the bytes corresponding to positions matching with the processing procedure number counted from higher-order bytes are rewritten from "0" to "1".

For example, when a processing interruption (e.g., power-off) occurs, it is understood to be in the midst of updating processing procedure 2, as shown in FIG. 9. The corresponding line (processing procedure 2) in the update procedure (FIG. 8) is referred to, and the processing destination (copying destination or adding destination) is checked, thereby confirming the block number of the processing target. In this case, since it is Fdat_2_start, the number is block 2. Accordingly, it can be understood that the writing back original address is (Fdat_1_start size), by referring to FIG. 7.

<Contents of Update Process>

Figure 10:
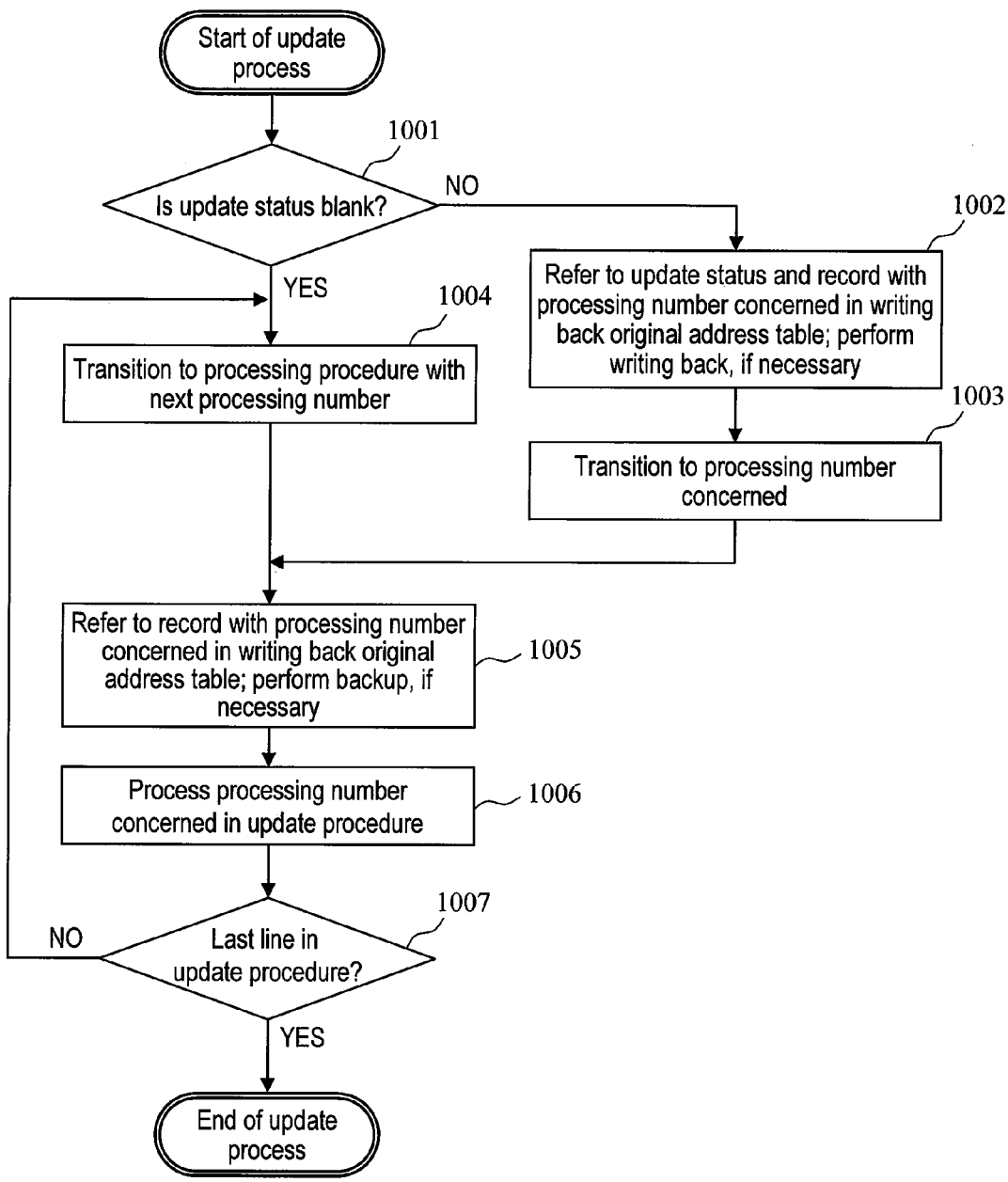
FIG. 10 is a flowchart for illustrating an update process (including a recovery process) in an information apparatus.

FIG. 10 is a flowchart for illustrating an update process including a recovery process from an interruption performed in the information apparatus 3. The CPU 31A performs the update process through the update program 3303B (an update process section is configured by cooperation of both). The description will hereinafter be made with the update program 3303B being as the subject of the operation.

First, the update program 3303B refers to the update status table (FIG. 9), and checks whether the update statuses are entirely blank or not (step 1101). If the update status table is not blank, the processing proceeds to step 1002. If the table is blank, the processing proceeds to step 1004. Note that, even if only one piece of information pertaining to the update status is included in the update status table, it is determined that the update status is not blank.

If it is determined that the update status is blank (step 1001: YES), that is, in a case where the update is not interrupted, the update program 3303B refers to the update procedure document (FIG. 8), and determines the processing target block (step 1004). The update program 3303B refers to a record with the processing number (processing target block number) in the writing back original address table, and the program performs the backup if necessary (step 1005). For example, if the writing back original address starts with Fbup, backup is necessary. If the address starts with Fdat, the data exists in the old data, thus negating the need for backup into a backup region. If an interruption occurs in the midst of the backup process, the backup is simply performed again, and accordingly the writing back process is not performed.

The update program 3303B processes the processing target block according to the update procedure (step 1006). Further, the update program 3303B checks whether it is the last line of the update procedure or not. If it is the last line, the processing proceeds to step 1004. If it is not the last line, the processing is finished.

On the other hand, if the update status is not blank, it is a case where the update has been interrupted. Accordingly, the update program 3303B refers to the update status and the record with the processing number concerned in the writing back original address table, and, in a case where writing back is necessary, the program performs writing back (step 1002). Here, "in a case where writing back is necessary" means a case where, after backup has been completed, an interruption occurs in the update process according to the update procedure document. If an interruption occurs in the midst of the backup process, the backup is simply performed again, and thus this does not fall under "in a case where writing back is necessary". For example, in a case of the update status in FIG. 9, if an interruption has occurred, this means that the interruption has occurred when the processing procedure 2 is performed. Accordingly, the processing procedure 2 of the update procedure document (FIG. 8) is referred to. The processing (copying) destination of the processing procedure 2 is thus referred to, and it becomes clear that the processing target block is the clock 2. The writing back original address table (FIG. 7) is then referred to, and thus Fdat start is detected. Accordingly, a process of writing back an amount of the size of data of the block 2, or the processing target, is performed from the beginning of the block 1 of the old data.

After completion of the step 1002, the update program 3303B refers to the update procedure document (FIG. 8), and determines the processing target block (step 1003). Subsequently, the processing proceeds to step 1005.

On activation from the normal firmware block 3302, the update firmware block 3303 may be mounted, and the update program 3303B may be performed. Even in this case, if there has been an interruption, activation is performed from the update firmware block 3303, thus allowing the update to be restarted.

<Variation>

(1) In the above embodiment, the unit of processing is a block. However, an operation in units smaller than the blocks is allowed by delimiting each record in the update procedure and the writing back original address table with commas and arranging plural pieces of data.

FIG. 11 is a diagram showing an update procedure and a writing back original address table for allowing an operation in units smaller than blocks.

FIG. 11A means that, on the writing back process, data of a half size of the block is acquired from the beginning of the backup region and the latter half is acquired from data of the latter half of the block 1. This allows recovery after the interruption of update even in a case where one block data is divided and saved in the respective positions.

FIG. 11B means that, on the update process, processes are performed according to which data of a half size of the block is acquired from the beginning of the difference block and inserted into the block 2 from the beginning thereof and the former half of data of the block 1 is copied to the latter half of the block 2. This enables the data of one block to be rewritten from pieces of data at the respective positions, thereby allowing the size of the difference data to be reduced.

(2) With reference to FIG. 10, restart from the interruption and writing back are described in step 1002. However, recovery on a RAM may be adopted.

(3) On the first policy, an example in the case where the backup capacity is 1 block at the maximum is shown. However, this may be at least 1 block.

On the second policy, the data for returning from the interruption point to the original data may be continuously stored in the backup region until the update is completed. Here, data other than necessary data may be deleted.

On the third policy, the difference data may be deleted when the data become unnecessary.

On the fourth policy, the writing back process may be performed even in a case with self-reference.

CONCLUSION

In this embodiment, the management apparatus generates difference data from old data and new data, generates an update procedure document, describing an update process for generating the new firmware from the old firmware and the difference data in the information apparatus, generates writing back reference information (writing back original address table) describing information for performing a process (writing back process) of recovering data in an update process in the information apparatus to a state before starting of the update process when the update process has been interrupted. The information apparatus performs an update process according to the firmware update data. According to such a configuration, even in a case of an interruption of the update process in the information apparatus, recovery from the interruption can be smoothly performed, and the update process can be restarted from the point where the interruption has occurred, by means of the writing back process.

The management apparatus prepares plural types of processing orders for performing an update process on the plurality of blocks (corresponding to divided blocks in a non-volatile memory), and generates intermediate data representing a status of each block in rewriting from the old firmware to the new firmware with respect to each processing order. Further, the management apparatus checks necessity of backup and necessity of extracting difference data in the units of blocks using the new firmware and the intermediate data. Moreover, the management apparatus identifies the processing order whose total value of a capacity required for the backup and a capacity required for storing the difference data among the plurality of processing orders on the basis of a check result pertaining to the necessity of backup and the necessity of extracting the difference data is the smallest. The identified processing order is described in the update procedure document. More specifically, the management apparatus compares a processing target block and other blocks with each other in the intermediate data, and checks the necessity of backup according to whether the blocks match with each other or not, and compares a processing target block in the new firmware and all blocks in the intermediate data with each other, and checks the necessity of extracting the difference data according to whether the blocks match with each other or not. Thus, introduction of a concept of the intermediate data allows checking of necessity of backup and necessity of extracting difference data. Identification of the processing order with a small degree of necessity thereof allows a memory region required when the recovery process from an interruption of update is performed to be reduced. This enables the cost of the information apparatus to be reduced.

The management apparatus describes the writing back reference information so as to instruct a reference position and a size of data for performing the writing back process in units smaller than a size of the block and thereby to allow data of the writing back process to be acquired from a plurality of positions. The management apparatus describes an update procedure of the update procedure document so as to instruct a reference position and a size of data for performing the update process in units smaller than a size of the block and thereby to allow data of the update process to be acquired from a plurality of positions. This configuration allows data of one block to be rewritten from pieces of data stored in respective positions, thereby enabling the size of the difference data to be further reduced.

On the other hand, the information apparatus manages an update status including information representing that a backup has been completed and information representing that an update process has been completed in units of blocks in correspondence with a processing procedure of the update procedure document. Such management of the update status allows, in a case of an interruption, easily grasping to which block, what process has been performed, and from which block recovery is performed. This allows smooth transition to the recovery process.

In a case of occurrence of a processing interruption, the information apparatus checks the update status, and identifies which processing procedure is being performed when the interruption has occurred, refers to the update procedure document, and identifies the block in process according to the identified processing procedure, and checks the writing back reference information, performs a data writing back process on the identified block in process, and makes the block be in a state before starting of the update process. According to this configuration, the block to be subjected to the writing back process can easily be identified, and it can easily be identified from which region the writing back process on the processing target block is to be performed. Only a necessary block may be made to become a state before starting the update process, instead of the entire firmware. Thus, recovery from an interruption of update can be realized while saving the capacity of a nonvolatile memory used for storing backup data and the difference data.

The present invention can be realized by a program code of software realizing functions of the embodiment of the present invention. In this case, a storing medium recorded with the program code is provided for a system or an apparatus. A computer (CPU or MPU) of the system or the apparatus reads the program code stored in the storing medium. In this case, the program code itself, having been read from the storing medium, realizes the functions of the aforementioned embodiment. The program code itself and the storing medium storing the code configure the present invention. The storing media for providing such a program code include, for example, a flexible disc, a CD-ROM, a DVD-ROM, a hard disk, an optical disc, a magneto-optical disc, a CD-R, a magnetic tape, a nonvolatile memory card, a ROM and the like.

According to instructions of the program code, an OS (operating system) and the like operating on the computer may perform some or all parts of actual processing, and the processing may realize the aforementioned functions of the embodiment. Further, the program code read from the storing medium may be written on a memory of the computer, and subsequently, according to the instructions of the program code, the CPU or the like of the computer may perform some or all parts of actual processing, and the processing thereof may realize the aforementioned functions of the embodiment.

Further, a program code of software realizing the functions of the embodiment may be distributed via a network, and stored in a storing section such as a hard disk or a memory of the system or the apparatus or in a storing medium such as a CD-RW or a CD-R, the computer (CPU or MPU) of the system or the apparatus may read the program code stored in the storing section or the storing medium and performs the code when used.

REFERENCE SIGNS LIST

1 . . . management apparatus
11A, 21A, 31A . . . CPU
11B, 21B, 31B . . . memory
12, 22, 32 . . . communication port
13, 23 . . . external storing apparatus
33 . . . nonvolatile memory
13A . . . difference extraction section
13B, 23A . . . transfer section
13C . . . old data
13D . . . new data
13E . . . intermediate data
13F . . . processing status table
13G . . . backup necessity table
13H . . . difference distribution necessity table
13I . . . difference data
13J . . . update procedure
13K . . . writing back original address table
23B . . . distribution package
3301 . . . boot block
3302 . . . normal firmware block
3303 . . . update firmware block
3304 . . . difference data storing block
3305 . . . backup block
3301A . . . boot loader
3301B . . . startup setting
3302A . . . normal underlying software
3302B . . . normal application software
3303A . . . update underlying software
3303B . . . update program
3304A . . . difference data
3304B . . . update procedure document
3304C . . . writing back original address table
3304D . . . update status

The invention claimed is:

1. A firmware update system updating old firmware in an information apparatus to new firmware, comprising:
a management apparatus generating firmware update data, the management apparatus including a communication port, a processor and a memory; and an information apparatus acquiring the firmware update data and updating the old firmware to the new firmware, the information apparatus including a communication port, a processor and a memory wherein the memory of the management apparatus stores instructions which cause the processor thereof to generate difference data from data of the old firmware and the new firmware, generate an update procedure document describing an update process for generating the new firmware from the old firmware and the difference data in the information apparatus, generate writing back reference information describing information for performing a writing back process of recovering data in an update process in the information apparatus to a state before starting of the update process when the update process has been interrupted, and generate the difference data, the update procedure document and the writing back reference information as the firmware update data, and the memory of the information apparatus stores instructions which cause the processor thereof to update the old firmware to the new firmware on the basis of the difference data, the update procedure document and the writing back reference information included in the firmware update data, the memory of the management apparatus further stores instructions which cause the processor thereof to:

divide the old firmware and the new firmware into a plurality of blocks, processes the blocks in units of blocks, and generates the firmware update data, provide a plurality of processing orders for performing an update process on the plurality of blocks, generate intermediate data representing a status of each block in rewriting from the old firmware to the new firmware with respect to each processing order, and check a necessity of backup and a necessity of extracting difference data in the units of blocks using the new firmware and the intermediate data, and identify the processing order whose total value of a capacity required for the backup and a capacity required for storing the difference data among the plurality of processing orders is the smallest based on checking the necessity of backup and the necessity of extracting the difference data, and described the identified processing order in the update procedure document.

2. The firmware update system according to claim 1, wherein the memory of management apparatus further stores instructions which cause the processor thereof to:
compare a processing target block and other blocks with each other in the intermediate data, and check the necessity of backup according to whether the blocks match with each other or not, and
compare a processing target block in the new firmware and all blocks in the intermediate data with each other, and check the necessity of extracting the difference data according to whether the blocks match with each other or not.

3. The firmware update system according to claim 1, wherein the memory of the management apparatus further stores instructions which cause the processor thereof to:
describe the writing back reference information so as to instruct a reference position and a size of data for performing the writing back process in units smaller than a size of the block and thereby to allow data of the writing back process to be acquired from a plurality of positions.

4. The firmware update system according to claim 1, wherein the memory of management apparatus further stores instructions which cause the processor thereof to:
describe an update procedure of the update procedure document so as to instruct a reference position and a size of data for performing the update process in units smaller than a size of the block and thereby to allow data of the update process to be acquired from a plurality of positions.

5. The firmware update system according to claim 1, wherein the memory of the information apparatus further stores instructions which cause the processor thereof to:
manage an update status including information representing that a backup has been completed and information representing that an update process has been completed in units of blocks in correspondence with a processing procedure of the update procedure document.

6. The firmware update system according to claim 5, wherein the memory of the information processing apparatus further stores instructions which cause the processor thereof to:
check the update status, in a case of a processing interruption occurring, and identify which processing procedure is being performed when the interruption has occurred, refer to the update procedure document, and identify the block in process according to the identified processing procedure, and
check the writing back reference information, perform a data writing back process on the identified block in process, and make the block be in a state before starting of the update process.

7. An information apparatus updating old firmware to new firmware on the basis of firmware update data,
the firmware update data including difference data generated from data of the old firmware and the new firmware, an update procedure document describing an update process for generating the new firmware from the old firmware and the difference data, and writing back reference information describing information for performing a writing back process of recovering data in an update process to a state before starting of the update process when the update process has been interrupted, the information apparatus comprising:
a communication port;
a processor; and
a memory storing instructions which cause the processor to execute:
an update data acquisition section which acquires the firmware update data, and
an update process section which updates the old firmware to the new firmware on the basis of the difference data, the update procedure document and the writing back reference information included in the firmware update data,
wherein the update process section manages an update status including information representing that a backup has been completed and information representing that an update process has been completed in units of blocks acquired by dividing the old firmware and the new firmware into a plurality thereof in correspondence with a processing procedure of the update procedure document, and
wherein the memory further stores instructions which cause the processor to:

check the update status, in a case of a processing interruption occurring, and identify which processing procedure is being performed when the interruption has occurred, refer to the update procedure document, and identify the block in process according to the identified processing procedure, and check the writing back reference information, perform a data writing back process on the identified block in process, and make the block be in a state before starting of the update process.

8. A non-transitory computer-readable storage medium storing an executable program thereon, where the executable program causes a computer to function as the information apparatus according to claim 7.

* * * * *